US010808097B2

(12) United States Patent
Hardman et al.

(10) Patent No.: US 10,808,097 B2
(45) Date of Patent: Oct. 20, 2020

(54) CARBON BLACK FROM NATURAL GAS

(71) Applicant: MONOLITH MATERIALS, INC., Redwood City, CA (US)

(72) Inventors: Ned J. Hardman, Woodside, CA (US); Roscoe W. Taylor, San Mateo, CA (US); Alexander F. Hoermann, Menlo Park, CA (US); Peter L. Johnson, Mountain View, CA (US); Christopher J. -P. Cardinal, Sunnyvale, CA (US); Robert J. Hanson, San Carlos, CA (US)

(73) Assignee: MONOLITH MATERIALS, INC., Lincoln, NE (US)

( * ) Notice: Subject to any disclaimer, the term of this patent is extended or adjusted under 35 U.S.C. 154(b) by 0 days.

(21) Appl. No.: 15/262,539

(22) Filed: Sep. 12, 2016

(65) Prior Publication Data

US 2017/0073522 A1 Mar. 16, 2017

Related U.S. Application Data

(60) Provisional application No. 62/218,137, filed on Sep. 14, 2015.

(51) Int. Cl.
*C09C 1/52* (2006.01)
*C08K 3/04* (2006.01)
*C09C 1/48* (2006.01)
*C08J 5/00* (2006.01)
*C01B 32/15* (2017.01)
*C09C 1/50* (2006.01)

(52) U.S. Cl.
CPC ............... *C08K 3/04* (2013.01); *C01B 32/15* (2017.08); *C08J 5/005* (2013.01); *C09C 1/485* (2013.01); *C01P 2002/77* (2013.01); *C01P 2004/04* (2013.01); *C01P 2004/32* (2013.01); *C01P 2004/61* (2013.01); *C01P 2004/62* (2013.01); *C01P 2004/64* (2013.01); *C01P 2006/12* (2013.01); *C01P 2006/19* (2013.01); *C01P 2006/80* (2013.01); *C08J 2321/00* (2013.01); *C08K 2201/003* (2013.01); *C08K 2201/011* (2013.01); *C09C 1/50* (2013.01)

(58) Field of Classification Search
CPC ..................................... C08K 3/04; C09C 1/52
USPC ........................................................ 524/495
See application file for complete search history.

(56) References Cited

U.S. PATENT DOCUMENTS

| | | |
|---|---|---|
| 1,339,225 A | 5/1920 | Rose |
| 1,536,612 A | 5/1925 | Lewis |
| 1,597,277 A | 8/1926 | Jakowsky |
| 2,062,358 A | 9/1932 | Frolich |
| 2,002,003 A | 5/1935 | Eisenhut et al. |
| 2,039,312 A | 5/1936 | Goldman et al. |
| 2,393,106 A | 1/1946 | Johnson et al. |
| 2,557,143 A | 6/1951 | Royster |
| 2,572,851 A | 10/1951 | Gardner et al. |
| 2,603,669 A | 7/1952 | Chappell |
| 2,616,842 A | 11/1952 | Sheer et al. |
| 2,785,964 A | 3/1957 | Pollock |
| 2,850,403 A | 9/1958 | Day |
| 2,851,403 A | 9/1958 | Hale |
| 2,897,071 A | 7/1959 | Gilbert |
| 2,951,143 A | 8/1960 | Anderson et al. |
| 3,009,783 A | 11/1961 | Sheer et al. |
| 3,073,769 A | 1/1963 | Doukas |
| 3,288,696 A | 11/1966 | Orbach |
| 3,307,923 A | 3/1967 | Ruble |
| 3,309,780 A | 3/1967 | Goins |
| 3,331,664 A | 7/1967 | Jordan |
| 3,344,051 A | 9/1967 | Latham, Jr. |
| 3,308,164 A | 10/1968 | Johnson |
| 3,408,164 A | 10/1968 | Johnson |
| 3,409,403 A | 11/1968 | Bjornson et al. |
| 3,420,632 A | 1/1969 | Ryan |
| 3,431,074 A | 3/1969 | Jordan |
| 3,464,793 A | 9/1969 | Jordan et al. |
| 3,619,140 A | 11/1971 | Morgan et al. |
| 3,637,974 A | 1/1972 | Tajbl et al. |
| 3,673,375 A | 6/1972 | Camacho |
| 3,725,103 A | 4/1973 | Jordan et al. |
| 3,922,335 A | 11/1975 | Jordan et al. |
| 3,981,654 A | 9/1976 | Rood et al. |
| 3,981,659 A | 9/1976 | Myers |
| 3,984,743 A | 10/1976 | Horie |

(Continued)

FOREIGN PATENT DOCUMENTS

AU 28970/71 A 11/1972
CA 830378 A 12/1969

(Continued)

OTHER PUBLICATIONS

Gago et al., Trends in Fullerene Research, Published by Nova Science Publishers, Inc. (2007), pp. 1-46.*
Non-Final Office Action dated May 2, 2017 in U.S. Appl. No. 14/610,299.
Ex Parte Quayle Action dated May 19, 2017 in U.S. Appl. No. 14/601,761.

(Continued)

*Primary Examiner* — Deve V Hall
(74) *Attorney, Agent, or Firm* — Wilson Sonsini Goodrich & Rosati

(57) ABSTRACT

Carbon nanoparticles made in a one step process. A method of making carbon black nanoparticles is described, including adding a hydrocarbon to a heated gas to produce carbon nanoparticles that are less than 1 micron volume equivalent sphere and have an Lc greater than 3.0 nm. Elastomer composites containing such particles are also described.

20 Claims, 4 Drawing Sheets

(56) References Cited

U.S. PATENT DOCUMENTS

| | | |
|---|---|---|
| 4,028,072 A | 6/1977 | Braun et al. |
| 4,035,336 A | 7/1977 | Jordan et al. |
| 4,057,396 A | 11/1977 | Matovich |
| 4,075,160 A | 2/1978 | Mills et al. |
| 4,101,639 A | 7/1978 | Surovikin et al. |
| 4,199,545 A | 4/1980 | Matovich |
| 4,282,199 A | 8/1981 | Lamond et al. |
| 4,289,949 A | 9/1981 | Raaness et al. |
| 4,317,001 A | 2/1982 | Silver et al. |
| 4,372,937 A | 2/1983 | Johnson |
| 4,404,178 A | 9/1983 | Johnson et al. |
| 4,452,771 A | 6/1984 | Hunt |
| 4,431,624 A | 8/1984 | Casperson |
| 4,472,172 A | 9/1984 | Sheer et al. |
| 4,543,470 A | 9/1985 | Santen et al. |
| 4,553,981 A | 11/1985 | Fuderer |
| 4,601,887 A | 7/1986 | Dorn et al. |
| 4,678,888 A | 7/1987 | Camacho et al. |
| 4,689,199 A | 8/1987 | Eckert et al. |
| 4,755,371 A | 7/1988 | Dickerson |
| 4,765,964 A | 8/1988 | Gravley et al. |
| 4,787,320 A | 11/1988 | Raaness et al. |
| 4,864,096 A | 9/1989 | Wolf et al. |
| 4,977,305 A | 12/1990 | Severance, Jr. |
| 5,039,312 A | 8/1991 | Hollis, Jr. et al. |
| 5,045,667 A | 9/1991 | Iceland et al. |
| 5,046,145 A | 9/1991 | Drouet |
| 5,105,123 A | 4/1992 | Ballou |
| 5,147,998 A | 9/1992 | Tsantrizos et al. |
| 5,206,880 A | 4/1993 | Olsson |
| 5,352,289 A | 10/1994 | Weaver et al. |
| 5,399,957 A | 3/1995 | Vierboom et al. |
| 5,427,762 A | 6/1995 | Steinberg et al. |
| 5,476,826 A | 12/1995 | Greenwald et al. |
| 5,481,080 A | 1/1996 | Lynum et al. |
| 5,486,674 A | 1/1996 | Lynum et al. |
| 5,500,501 A | 3/1996 | Lynum et al. |
| 5,527,518 A * | 6/1996 | Lynum .................. C09C 1/487 423/449.1 |
| 5,593,644 A | 1/1997 | Norman et al. |
| 5,604,424 A | 2/1997 | Shuttleworth |
| 5,611,947 A | 3/1997 | Vavruska |
| 5,673,285 A | 9/1997 | Wittle et al. |
| 5,717,293 A | 2/1998 | Sellers |
| 5,725,616 A | 3/1998 | Lynum et al. |
| 5,749,937 A | 5/1998 | Detering et al. |
| 5,935,293 A | 8/1999 | Detering et al. |
| 5,951,960 A | 9/1999 | Lynum et al. |
| 5,989,512 A | 11/1999 | Lynum et al. |
| 5,997,837 A | 12/1999 | Lynum et al. |
| 6,068,827 A | 5/2000 | Lynum et al. |
| 6,099,696 A | 8/2000 | Schwob et al. |
| 6,188,187 B1 | 2/2001 | Harlan |
| 6,197,274 B1 | 3/2001 | Mahmud et al. |
| 6,277,350 B1 | 8/2001 | Gerspacher |
| 6,358,375 B1 | 3/2002 | Schwob |
| 6,380,507 B1 | 4/2002 | Childs |
| 6,395,197 B1 | 5/2002 | Detering et al. |
| 6,403,697 B1 | 6/2002 | Mitsunaga et al. |
| 6,441,084 B1 | 8/2002 | Lee et al. |
| 6,442,950 B1 | 9/2002 | Tung |
| 6,444,727 B1 | 9/2002 | Yamada et al. |
| 6,602,920 B2 | 8/2003 | Hall et al. |
| 6,703,580 B2 | 3/2004 | Brunet et al. |
| 6,773,689 B1 | 8/2004 | Lynum et al. |
| 6,955,707 B2 | 10/2005 | Ezell et al. |
| 7,167,240 B2 | 1/2007 | Stagg |
| 7,294,314 B2 | 11/2007 | Graham |
| 7,312,415 B2 | 12/2007 | Ohmi et al. |
| 7,360,309 B2 | 4/2008 | Vaidyanathan et al. |
| 7,431,909 B1 | 10/2008 | Rumpf et al. |
| 7,452,514 B2 | 11/2008 | Fabry et al. |
| 7,462,343 B2 | 12/2008 | Lynum et al. |
| 7,563,525 B2 | 7/2009 | Ennis |
| 7,655,209 B2 | 2/2010 | Rumpf et al. |
| 7,777,151 B2 | 8/2010 | Kuo |
| 7,968,191 B2 | 6/2011 | Hampden-Smith et al. |
| 8,147,765 B2 | 4/2012 | Muradov et al. |
| 8,221,689 B2 | 7/2012 | Boutot et al. |
| 8,257,452 B2 | 9/2012 | Menzel |
| 8,277,739 B2 | 10/2012 | Monsen et al. |
| 8,323,793 B2 | 12/2012 | Hamby et al. |
| 8,443,741 B2 | 5/2013 | Chapman et al. |
| 8,471,170 B2 | 6/2013 | Li et al. |
| 8,486,364 B2 | 7/2013 | Vanier et al. |
| 8,501,148 B2 | 8/2013 | Belmont et al. |
| 8,581,147 B2 | 11/2013 | Kooken et al. |
| 8,710,136 B2 | 4/2014 | Yurovskaya et al. |
| 8,771,386 B2 | 7/2014 | Licht et al. |
| 8,784,617 B2 | 7/2014 | Novoselov et al. |
| 8,850,826 B2 | 10/2014 | Ennis |
| 8,871,173 B2 | 10/2014 | Nester et al. |
| 8,911,596 B2 | 12/2014 | Vancina |
| 9,095,835 B2 | 8/2015 | Skoptsov et al. |
| 9,315,735 B2 | 4/2016 | Cole et al. |
| 9,445,488 B2 | 9/2016 | Foret |
| 9,574,086 B2 | 2/2017 | Johnson et al. |
| 10,100,200 B2 | 10/2018 | Johnson et al. |
| 10,138,378 B2 | 11/2018 | Hoermman et al. |
| 10,370,539 B2 | 8/2019 | Johnson et al. |
| 2001/0029888 A1 | 10/2001 | Sindarrajan et al. |
| 2001/0039797 A1 | 11/2001 | Cheng |
| 2002/0000085 A1 | 1/2002 | Hall et al. |
| 2002/0050323 A1 | 5/2002 | Moisan et al. |
| 2002/0051903 A1 | 5/2002 | Masuko et al. |
| 2002/0157559 A1 | 10/2002 | Brunet et al. |
| 2003/0103858 A1 | 6/2003 | Baran et al. |
| 2003/0152184 A1 | 8/2003 | Shehane et al. |
| 2004/0047779 A1 | 3/2004 | Denison |
| 2004/0071626 A1 | 4/2004 | Smith et al. |
| 2004/0081862 A1 | 4/2004 | Herman |
| 2004/0148860 A1 | 8/2004 | Fletcher |
| 2004/0168904 A1 | 9/2004 | Anazawa et al. |
| 2004/0211760 A1 | 10/2004 | Delzenne et al. |
| 2004/0216559 A1 | 11/2004 | Kim et al. |
| 2004/0247509 A1 | 12/2004 | Newby |
| 2005/0063892 A1 | 3/2005 | Tandon et al. |
| 2005/0079119 A1 | 4/2005 | Kawakami et al. |
| 2005/0230240 A1 | 10/2005 | Dubrovsky et al. |
| 2006/0034748 A1 | 2/2006 | Lewis et al. |
| 2006/0037244 A1 | 2/2006 | Clawson |
| 2006/0068987 A1 | 3/2006 | Bollepalli et al. |
| 2006/0107789 A1 | 5/2006 | Deegan et al. |
| 2006/0155157 A1 | 7/2006 | Zarrinpashne et al. |
| 2006/0226538 A1 | 10/2006 | Kawata |
| 2006/0239890 A1 | 10/2006 | Chang et al. |
| 2007/0140004 A1 | 6/2007 | Marotta et al. |
| 2007/0183959 A1 | 8/2007 | Charlier et al. |
| 2007/0270511 A1 | 11/2007 | Melnichuk et al. |
| 2007/0293405 A1 | 12/2007 | Zhang et al. |
| 2008/0041829 A1 | 2/2008 | Blutke et al. |
| 2008/0121624 A1 | 5/2008 | Belashchenko et al. |
| 2008/0159947 A1 | 7/2008 | Yurovskaya et al. |
| 2008/0169183 A1 | 7/2008 | Hertel et al. |
| 2008/0182298 A1 | 7/2008 | Day |
| 2008/0226538 A1 | 9/2008 | Rumpf et al. |
| 2008/0279749 A1 | 11/2008 | Probst et al. |
| 2008/0292533 A1 | 11/2008 | Belmont et al. |
| 2009/0014423 A1 | 1/2009 | Li et al. |
| 2009/0090282 A1 | 4/2009 | Gold et al. |
| 2009/0142250 A1 | 6/2009 | Fabry et al. |
| 2009/0155157 A1 | 6/2009 | Stenger et al. |
| 2009/0173252 A1 | 7/2009 | Nakata et al. |
| 2009/0208751 A1 | 8/2009 | Green et al. |
| 2009/0230098 A1 | 9/2009 | Salsich et al. |
| 2010/0147188 A1 | 6/2010 | Mamak et al. |
| 2010/0249353 A1 | 9/2010 | Macintosh et al. |
| 2011/0036014 A1 | 2/2011 | Tsangaris et al. |
| 2011/0071692 A1 | 3/2011 | D'Amato et al. |
| 2011/0071962 A1 | 3/2011 | Lim |
| 2011/0076608 A1 | 3/2011 | Bergemann et al. |
| 2011/0138766 A1 | 6/2011 | Elkady et al. |
| 2011/0155703 A1 | 6/2011 | Winn |
| 2011/0180513 A1 | 7/2011 | Luhrs et al. |

(56) References Cited

U.S. PATENT DOCUMENTS

| | | |
|---|---|---|
| 2011/0239542 A1 | 10/2011 | Liu et al. |
| 2012/0018402 A1 | 1/2012 | Carducci et al. |
| 2012/0025693 A1 | 2/2012 | Wang et al. |
| 2012/0201266 A1 | 8/2012 | Boulos et al. |
| 2012/0232173 A1 | 9/2012 | Juranitch et al. |
| 2012/0292794 A1 | 11/2012 | Prabhu et al. |
| 2013/0039841 A1 | 2/2013 | Nester et al. |
| 2013/0062195 A1 | 3/2013 | Samaranayake et al. |
| 2013/0062196 A1 | 3/2013 | Sin |
| 2013/0092525 A1 | 4/2013 | Li et al. |
| 2013/0194840 A1 | 8/2013 | Huselstein et al. |
| 2013/0292363 A1 | 11/2013 | Hwang et al. |
| 2013/0323614 A1 | 12/2013 | Chapman et al. |
| 2013/0340651 A1 | 12/2013 | Wampler et al. |
| 2014/0000488 A1 | 1/2014 | Sekiyama et al. |
| 2014/0057166 A1 | 2/2014 | Yokoyama et al. |
| 2014/0131324 A1 | 5/2014 | Shipulski et al. |
| 2014/0190179 A1 | 7/2014 | Barker et al. |
| 2014/0224706 A1 | 8/2014 | Do et al. |
| 2014/0227165 A1 | 8/2014 | Hung et al. |
| 2014/0248442 A1 | 9/2014 | Luizi et al. |
| 2014/0290532 A1 | 10/2014 | Rodriguez et al. |
| 2014/0294716 A1 | 10/2014 | Susekov et al. |
| 2014/0339478 A1 | 11/2014 | Probst et al. |
| 2014/0357092 A1 | 12/2014 | Singh |
| 2014/0373752 A2 | 12/2014 | Hassinen et al. |
| 2015/0004516 A1 | 1/2015 | Kim et al. |
| 2015/0044516 A1 | 2/2015 | Kyrlidis et al. |
| 2015/0056516 A1 | 2/2015 | Hellring et al. |
| 2015/0064099 A1 | 3/2015 | Nester et al. |
| 2015/0180346 A1 | 6/2015 | Yuzurihara et al. |
| 2015/0210856 A1 | 7/2015 | Johnson et al. |
| 2015/0210857 A1 | 7/2015 | Johnson et al. |
| 2015/0210858 A1 | 7/2015 | Hoermann et al. |
| 2015/0211378 A1 | 7/2015 | Johnson et al. |
| 2015/0217940 A1 | 8/2015 | Si et al. |
| 2015/0218383 A1 | 8/2015 | Johnson et al. |
| 2015/0223314 A1 | 8/2015 | Hoermann et al. |
| 2015/0252168 A1 | 9/2015 | Schuck et al. |
| 2016/0030856 A1 | 2/2016 | Kaplan et al. |
| 2016/0210856 A1 | 7/2016 | Assenbaum et al. |
| 2016/0243518 A1 | 8/2016 | Spitzl |
| 2016/0293959 A1 | 10/2016 | Blizanac et al. |
| 2017/0034898 A1 | 2/2017 | Moss et al. |
| 2017/0037253 A1 | 2/2017 | Hardman et al. |
| 2017/0058128 A1 | 3/2017 | Johnson et al. |
| 2017/0066923 A1 | 3/2017 | Hardman et al. |
| 2017/0073522 A1 | 3/2017 | Hardman et al. |
| 2017/0349758 A1 | 12/2017 | Johnson |
| 2018/0015438 A1 | 1/2018 | Taylor et al. |
| 2018/0016441 A1 | 1/2018 | Taylor et al. |
| 2018/0022925 A1 | 1/2018 | Hardman et al. |
| 2019/0048200 A1 | 2/2019 | Johnson et al. |
| 2019/0100658 A1 | 4/2019 | Taylor et al. |

FOREIGN PATENT DOCUMENTS

| | | |
|---|---|---|
| CA | 964405 A1 | 3/1975 |
| CA | 2 353 752 A1 | 1/2003 |
| CA | 2 621 749 A1 | 8/2009 |
| CH | 203269847 U | 11/2013 |
| CN | 1458966 A | 11/2003 |
| CN | 1644650 A | 7/2005 |
| CN | 101092691 A | 12/2007 |
| CN | 102007186 A | 4/2011 |
| CN | 102060281 A | 5/2011 |
| CN | 102108216 A | 6/2011 |
| CN | 102993788 A | 3/2013 |
| CN | 103160149 A | 6/2013 |
| CN | 103391678 A | 11/2013 |
| DE | 211457 A3 | 7/1984 |
| DE | 198 07 224 A1 | 8/1999 |
| EA | 200300389 | 12/2003 |
| EP | 0325689 A1 | 8/1989 |
| EP | 0 616 600 A1 | 9/1994 |
| EP | 0 635 044 B1 | 2/1996 |
| EP | 0 635 043 B1 | 6/1996 |
| EP | 0 861 300 A1 | 9/1998 |
| EP | 1017622 A1 | 7/2000 |
| EP | 1088854 A2 | 4/2001 |
| EP | 1188801 A1 | 3/2002 |
| FR | 2 891 434 A1 | 3/2007 |
| GB | 395893 A | 7/1933 |
| GB | 987498 * | 3/1965 |
| GB | 1068519 | 5/1967 |
| GB | 1 400 266 A | 7/1975 |
| GB | 1 492 346 A | 11/1977 |
| GB | 2419883 A | 5/2006 |
| JP | H04228270 A | 8/1992 |
| JP | 6-322615 A | 11/1994 |
| JP | H09316645 A | 12/1997 |
| JP | H11123562 A | 5/1999 |
| JP | 2001253974 A | 9/2001 |
| JP | 2004-300334 A | 10/2004 |
| JP | 2005-243410 A | 9/2005 |
| JP | 2005235709 A | 9/2005 |
| KR | 10-2008-105344 A | 12/2008 |
| KR | 2014-0075261 A | 6/2014 |
| RU | 2425795 | 8/2011 |
| RU | 2488984 | 7/2013 |
| TW | 200418933 A | 10/2004 |
| WO | 2017/027385 A1 | 2/1917 |
| WO | 93/12031 A1 | 6/1993 |
| WO | 93/18094 A1 | 9/1993 |
| WO | 93/20153 A1 | 10/1993 |
| WO | WO-9320152 A1 | 10/1993 |
| WO | 93/23331 A1 | 11/1993 |
| WO | 1994/008747 A1 | 4/1994 |
| WO | 97/03133 A1 | 1/1997 |
| WO | WO-9813428 A1 | 4/1998 |
| WO | WO-0018682 A1 | 4/2000 |
| WO | WO-0224819 A1 | 3/2002 |
| WO | WO-03014018 A1 | 2/2003 |
| WO | WO-2004083119 A1 | 9/2004 |
| WO | 2 937 029 A1 | 4/2010 |
| WO | 2012/015313 A1 | 2/2012 |
| WO | 2012/067546 A2 | 5/2012 |
| WO | 2012/094743 A1 | 7/2012 |
| WO | 2012/149170 A1 | 11/2012 |
| WO | 2013/134093 A1 | 9/2013 |
| WO | 2013/184074 A1 | 12/2013 |
| WO | 2013/185219 A1 | 12/2013 |
| WO | 2014/000108 A1 | 1/2014 |
| WO | 2014/012169 A1 | 1/2014 |
| WO | 2015/049008 A1 | 4/2015 |
| WO | WO-2015051893 A1 | 4/2015 |
| WO | WO-2015093947 A1 | 6/2015 |
| WO | 2015/116797 A1 | 8/2015 |
| WO | 2015/116798 A1 | 8/2015 |
| WO | 2015/116800 A1 | 8/2015 |
| WO | 2015/116807 A1 | 8/2015 |
| WO | 2015/116811 A1 | 8/2015 |
| WO | 2015/116943 A2 | 8/2015 |
| WO | 2016/012367 A1 | 1/2016 |
| WO | WO-2016014641 A1 | 1/2016 |
| WO | 2016/126598 A1 | 8/2016 |
| WO | 2016/126599 A1 | 8/2016 |
| WO | 2016/126600 A1 | 8/2016 |
| WO | 2017/019683 A1 | 2/2017 |
| WO | 2017/034980 A1 | 3/2017 |
| WO | 2017/044594 A1 | 3/2017 |
| WO | 2017/048621 A1 | 3/2017 |
| WO | 2017/190015 A1 | 11/2017 |
| WO | 2017/190045 A1 | 11/2017 |
| WO | WO-2018165483 A1 | 9/2018 |
| WO | WO-2018195460 A1 | 10/2018 |

OTHER PUBLICATIONS

Extended European Search Report from EP Application No. 15742910.1 dated Jul. 18, 2017.

Supplementary Partial European Search Report from EP Application No. 15743214.7 dated Sep. 12, 2017.

(56) References Cited

OTHER PUBLICATIONS

ISR and Written Opinion from PCT/US2017/030139, dated Jul. 19, 2017.
ISR and Written Opinion from PCT/US2017/030179, dated Jul. 27, 2017.
Reese, J. (2017). Resurgence in American manufacturing will be led by the rubber and tire industry. Rubber World. 255. 18-21 and 23.
Non-Final Office Action dated Feb. 27, 2017 in U.S. Appl. No. 14/591,476.
Extended European Search Report from EP Application No. 15743214.7 dated Jan. 16, 2018.
Chiesa P, Lozza G, Mazzocchi L. Using Hydrogen as Gas Turbine Fuel. ASME. J. Eng. Gas Turbines Power. 2005;127(1):73-80. doi:10.1115/1.1787513.
Tsujikawa, Y., and T. Sawada. "Analysis of a gas turbine and steam turbine combined cycle with liquefied hydrogen as fuel." International Journal of Hydrogen Energy 7.6 (1982): 499-505.
Search report from RU2016135213, dated Feb. 12, 2018.
Non-Final Office Action dated Jan. 16, 2018 in U.S. Appl. No. 14/591,528.
Bakken, Jon Arne, et al. "Thermal plasma process development in Norway." Pure and applied Chemistry 70.6 (1998): 1223-1228.
Polman, E. A., J. C. De Laat, and M. Crowther. "Reduction of CO2 emissions by adding hydrogen to natural gas." IEA Green House Gas R&D programme (2003).
Verfondern, K., "Nuclear Energy for Hydrogen Production", Schriften des Forschungzentrum Julich, vol. 58, 2007.
U.S. Environmental Protection Agency, "Guide to Industrial Assessments for Pollution Prevention and Energy Efficiency," EPA 625/R-99/003, 1999.
Breeze, P. "Raising steam plant efficiency—Pushing the steam cycle boundaries." PEI Magazine 20.4 (2012).
Final Office Action dated Oct. 13, 2017 in U.S. Appl. No. 14/591,476.
Final Office Action dated Oct. 13, 2017 in U.S. Appl. No. 14/591,541.
Notice of Allowance dated Jan. 18, 2018 in U.S. Appl. No. 14/601,761.
Correced Notice of Allowance dated Feb. 9, 2018 in U.S. Appl. No. 14/601,761.
Final Office Action dated Sep. 19, 2017 in U.S. Appl. No. 15/221,088.
Non-Final Office Action dated Jan. 9, 2018 in U.S. Appl. No. 15/259,884.
Non-Final Office Action dated Apr. 20, 2018 in U.S. Appl. No. 15/221,088.
ISR and Written Opinion from PCT/US2015/013482, dated Jun. 17, 2015.
ISR and Written Opinion from PCT/US2015/013505, dated May 11, 2015.
ISR and Written Opinion from PCT/US2015/013487, dated Jun. 16, 2015.
Donnet, Basal and Wang, "Carbon Black", New York: Marcel Dekker, 1993 pp. 46, 47 and 54.
Boehm, HP, "Some Aspects of Surface Chemistry of Carbon Blacks and Other Carbons", Carbon 1994, p. 759.
"Carbon Black Elastomer Interaction" Rubber Chemistry and Technology, 1991, pp. 19-39.
"The Impact of a Fullerene-Like Concept in Carbon Black Science", Carbon, 2002, pp. 157-162.
ISR and Written Opinion from PCT/US2015/013510, dated Apr. 22, 2015.
ISR and Written Opinion from PCT/US2016/015939, dated Jun. 3, 2016.
ISR and Written Opinion from PCT/US2016/015941, dated Feb. 22, 2016.
ISR and Written Opinion from PCT/US2016/015942, dated Apr. 11, 2016.
ISR and Written Opinion from PCT/US2016/044039, dated Oct. 6, 2016.
ISR and Written Opinion from PCT/US2016/045793, dated Oct. 18, 2016.
ISR and Written Opinion from PCT/US2016/050728, dated Nov. 18, 2016.
ISR and Written Opinion from PCT/US2016/051261, dated Nov. 18, 2016.
ISR and Written Opinion from PCT/US2015/013484, dated Apr. 22, 2015.
AP 42, Fifth Edition, vol. I, Chapter 6: Organic Chemical Process Industry, Section 6.1: Carbon Black.
Fulcheri, et al. "Plasma processing: a step towards the production of new grades of carbon black." Carbon 40.2 (2002): 169-176.
Grivei, et al. A clean process for carbon nanoparticles and hydrogen production from plasma hydrocarbon cracking. Publishable Report, European Commission JOULE III Programme, Project No. JOE3-CT97-0057, circa 2000.
Fabry, et al. "Carbon black processing by thermal plasma. Analysis of the particle formation mechanism." Chemical Engineering Science 56.6 (2001): 2123-2132.
Pristavita, et al. "Carbon nanoparticle production by inductively coupled thermal plasmas: controlling the thermal history of particle nucleation." Plasma Chemistry and Plasma Processing 31.6 (2011): 851-866.
Cho, et al. "Conversion of natural gas to hydrogen and carbon black by plasma and application of plasma black." Symposia—American Chemical Society, Div. Fuel Chem. vol. 49. 2004.
Pristavita, et al. "Carbon blacks produced by thermal plasma: the influence of the reactor geometry on the product morphology." Plasma Chemistry and Plasma Processing 30.2 (2010): 267-279.
Pristavita, et al. "Volatile Compounds Present in Carbon Blacks Produced by Thermal Plasmas." Plasma Chemistry and Plasma Processing 31.6 (2011): 839-850.
Garberg, et al. "A transmission electron microscope and electron diffraction study of carbon nanodisks." Carbon 46.12 (2008): 1535-1543.
Knaapila, et al. "Directed assembly of carbon nanocones into wires with an epoxy coating in thin films by a combination of electric field alignment and subsequent pyrolysis." Carbon 49.10 (2011): 3171-3178.
Krishnan, et al. "Graphitic cones and the nucleation of curved carbon surfaces." Nature 388.6641 (1997): 451-454.
Høyer, et al. "Microelectromechanical strain and pressure sensors based on electric field aligned carbon cone and carbon black particles in a silicone elastomer matrix." Journal of Applied Physics 112.9 (2012): 094324.
Naess, Stine Nalum, et al. "Carbon nanocones: wall structure and morphology." Science and Technology of advanced materials (2016), 7 pages.
Fulcheri, et al. "From methane to hydrogen, carbon black and water." International journal of hydrogen energy 20.3 (1995): 197-202.
ISR and Written Opinion from PCT/US2016/047769, dated Dec. 30, 2016.
D.L. Sun, F. Wang, R.Y. Hong, C.R. Xie, Preparation of carbon black via arc discharge plasma enhanced by thermal pyrolysis, Diamond & Related Materials (2015), doi: 10.1016/j.diamond.2015.11.004, 47 pages.
ISR and Written Opinion from PCT/US2015/013794, dated Jun. 19, 2015.
Biscoe, et al., An X-Ray study of carbon black. Journal of Applied physics, 1942; 13: 364-371.
Co-pending U.S. Appl. No. 16/180,635, filed Nov. 5, 2018.
EP16847102.7 Extended European Search Report dated Jul. 5, 2019.
U.S. Appl. No. 15/241,771 Office Action dated Mar. 13, 2019.
U.S. Appl. No. 15/259,884 Office Action dated May 31, 2019.
Co-pending U.S. Appl. No. 16/097,035, filed Oct. 26, 2018.
Co-pending U.S. Appl. No. 16/563,008, filed Sep. 6, 2019.
Co-pending U.S. Appl. No. 16/807,550, filed Mar. 3, 2020.
Donnet, et al., Observation of Plasma-Treated Carbon Black Surfaces by Scanning Tunnelling Microscopy. Carbon (1994) 32(2): 199-206.
EP16845031.0 Extended European Search Report dated Mar. 18, 2019.
EP17790549.4 Extended European Search Report dated Nov. 26, 2019.

(56) References Cited

OTHER PUBLICATIONS

EP17790570.0 Extended European Search Report dated Nov. 8, 2019.
Extended European Search Report for EP Application No. 16747055.8, dated Jun. 27, 2018.
Extended European Search Report for EP Application No. 16747056.6 dated Jun. 27, 2018.
Extended European Search Report for EP Application No. 16747057.4 dated Oct. 9, 2018.
Extended European Search Report for EP Application No. 16835697.0 dated Nov. 28, 2018.
Gago, et al., Growth mechanisms and structure of fullerene-like carbon-based thin films: superelastic materials for tribological applications. Trends in Fullerene Research, Published by Nova Science Publishers, Inc. (2007): 1-46.
Hernandez, et al. Comparison of carbon nanotubes and nanodisks as percolative fillers in electrically conductive composites. Scripta Materialia 58 (2008) 69-72.
International Preliminary Report on Patentability for Application No. PCT/US2015/013482 dated Aug. 2, 2016.
International Preliminary Report on Patentability for Application No. PCT/US2015/013484 dated Aug. 2, 2016.
International Preliminary Report on Patentability for Application No. PCT/US2015/013487 dated Aug. 2, 2016.
International Preliminary Report on Patentability for Application No. PCT/US2015/013505 dated Aug. 2, 2016.
International Preliminary Report on Patentability for Application No. PCT/US2015/013510 dated Aug. 2, 2016.
International Preliminary Report on Patentability for Application No. PCT/US2017/030139 dated Oct. 30, 2018.
International Preliminary Report on Patentability for Application No. PCT/US2017/030179 dated Oct. 30, 2018.
International Search Report and Written Opinion for Application No. PCT/US2018/021627 dated May 31, 2018.
International Search Report and Written Opinion for Application No. PCT/US2018/028619 dated Aug. 9, 2018.
International Search Report and Written Opinion for Application No. PCT/US2018/048374 dated Nov. 21, 2018.
International Search Report and Written Opinion for Application No. PCT/US2018/048378 dated Dec. 20, 2018.
International Search Report and Written Opinion for Application No. PCT/US2018/048381 dated Dec. 14, 2018.
International Search Report for Application No. PCT/US2015/13482 dated Jun. 17, 2015.
International Search Report for Application No. PCT/US2015/13487 dated Jun. 16, 2015.
Larouche, et al.,Nitrogen Functionalization of Carbon Black in a Thermo-Convective Plasma Reactor. Plasma Chem Plasma Process (2011) 31: 635-647.
Medalia, et al., Tinting Strength of Carbon Black. Journal of Colloid and Interface Science 40.2. (1972).
Partial International Search Report for Application No. PCT/US2018/028619 dated Jun. 18, 2018.
PCT/US2018/021627 International Search Report and Written Opinion dated May 31, 2018.
PCT/US2018/028619 International Search Report and Written Opinion dated Aug. 9, 2018.
PCT/US2018/048374 International Search Report and Written Opinion dated Nov. 21, 2018.
PCT/US2018/057401 International Search Report and Written Opinion dated Feb. 15, 2019.
PCT/US2018/064538 International Search Report and Written Opinion dated Feb. 19, 2019.
PCT/US2019/025632 International Search Report and Written Opinion dated Jun. 24, 2019.
Reynolds, Electrode Resistance: How Important is Surface Area. Oct. 10, 2016. p. 3 para[0001]; Figure 3; Retrieved from http://electrotishing.net/2016/10/10/electrode-resistance-how-important-is-surface-area/ on May 8, 2018.
Translation of Official Notification of RU Application No. 2016135213 dated Feb. 12, 2018.
U.S. Appl. No. 14/591,541 Notice of Allowance dated Sep. 17, 2018.
U.S. Appl. No. 14/591,528 Office Action dated Jan. 17, 2019.
U.S. Appl. No. 15/548,346 Office Action dated Oct. 22, 2019.
U.S. Appl. No. 15/548,348 Office Action dated Apr. 25, 2019.
U.S. Appl. No. 14/591,476 Notice of Allowance dated Mar. 20, 2019.
U.S. Appl. No. 14/591,476 Office Action dated Jul. 11, 2016.
U.S. Appl. No. 14/591,476 Office Action dated Jun. 7, 2018.
U.S. Appl. No. 14/591,476 Office Action dated Mar. 16, 2016.
U.S. Appl. No. 14/591,528 Office Action dated Oct. 28, 2019.
U.S. Appl. No. 14/591,541 Notice of Allowance dated Jun. 7, 2018.
U.S. Appl. No. 14/591,541 Office Action dated Feb. 22, 2017.
U.S. Appl. No. 14/591,541 Office Action dated Jul. 14, 2016.
U.S. Appl. No. 14/591,541 Office Action dated Mar. 16, 2016.
U.S. Appl. No. 14/601,761 Notice of Allowance dated Feb. 9, 2018.
U.S. Appl. No. 14/601,761 Notice of Allowance dated Jun. 19, 2018.
U.S. Appl. No. 14/601,761 Notice of Allowance dated Oct. 11, 2018.
U.S. Appl. No. 14/601,761 Notice of Allowance dated Sep. 17, 2018.
U.S. Appl. No. 14/601,761 Office Action dated Apr. 14, 2016.
U.S. Appl. No. 14/601,761 Office Action dated Oct. 19, 2016.
U.S. Appl. No. 14/601,793 Notice of Allowance dated Oct. 7, 2016.
U.S. Appl. No. 14/601,793 Office Action dated Apr. 13, 2016.
U.S. Appl. No. 14/601,793 Office Action dated dated Aug. 3, 2016.
U.S. Appl. No. 14/610,299 Notice of Allowance dated Feb. 20, 2020.
U.S. Appl. No. 14/610,299 Office Action dated Sep. 25, 2018.
U.S. Appl. No. 15/221,088 Office Action dated Dec. 23, 2016.
U.S. Appl. No. 15/221,088 Office Action dated Dec. 4, 2019.
U.S. Appl. No. 15/221,088 Office Action dated Mar. 7, 2019.
U.S. Appl. No. 15/229,608 Office Action dated Apr. 8, 2019.
U.S. Appl. No. 15/229,608 Office Action dated Oct. 25, 2019.
U.S. Appl. No. 15/241,771 Office Action dated Jul. 6, 2018.
U.S. Appl. No. 15/241,771 Office Action dated Sep. 25, 2019.
U.S. Appl. No. 15/259,884 Office Action dated Feb. 25, 2020.
U.S. Appl. No. 15/259,884 Office Action dated Jan. 9, 2018.
U.S. Appl. No. 15/259,884 Office Action dated Oct. 11, 2018.
U.S. Appl. No. 15/410,283 Office Action dated Jan. 16, 2020.
U.S. Appl. No. 15/410,283 Office Action dated Jun. 7, 2018.
U.S. Appl. No. 15/410,283 Office Action dated Mar. 12, 2019.
U.S. Appl. No. 15/548,348 Notice of Allowance dated Dec. 12, 2019.
U.S. Appl. No. 15/548,352 Office Action dated Jan. 31, 2020.
U.S. Appl. No. 15/548,352 Office Action dated May 9, 2019.
U.S. Appl. No. 15/548,352 Office Action dated Oct. 10, 2018.
U.S. Appl. No. 16/159,144 Office Action dated Mar. 26, 2020.
Wikipedia, Heating Element. Oct. 14, 2016. p. 1 para[0001]. Retrieved from https://en.wikipedia.org/w/index.php?title=Heating_element&oldid=744277540 on May 9, 2018.
Wikipedia, Joule Heating. Jan. 15, 2017. p. 1 para[0002]. Retrieved from https://en.wikipedia.org/w/index . Dhp?title=Joule_heating&oldid=760136650 on May 9, 2018.
U.S. Appl. No. 15/229,608 Office Action dated May 15, 2020.
U.S. Appl. No. 15/241,771 Office Action dated May 1, 2020.
U.S. Appl. No. 15/548,346 Office Action dated May 4, 2020.

* cited by examiner

CARBON BLACK FROM NATURAL GAS

CROSS-REFERENCE TO RELATED APPLICATIONS

The present application claims the benefit under 35 U.S.C. § 119(e) of U.S. Provisional Application No. 62/218,137 filed Sep. 14, 2015, the disclosure of which is expressly incorporated by reference herein in its entirety.

TECHNICAL FIELD

The field of art to which this invention generally pertains is methods and apparatus for making use of electrical energy to affect chemical changes.

BACKGROUND

There are many processes that can be used and have been used over the years to produce carbon black. The energy sources used to produce such carbon blacks over the years have, in large part, been closely connected to the raw materials used to convert hydrocarbon containing materials into carbon black. Residual refinery oils and natural gas have long been a resource for the production of carbon black. Energy sources have evolved over time in chemical processes such as carbon black production from simple flame, to oil furnace, to plasma, to name a few. As in all manufacturing, there is a constant search for more efficient and effective ways to produce such products, and new and improved products. Varying flow rates and other conditions of energy sources, varying flow rates and other conditions of raw materials, increasing speed of production, increasing yields, reducing manufacturing equipment wear characteristics, etc. have all been, and continue to be, part of this search over the years.

The embodiments described herein meet the challenges described above, and additionally attain more efficient and effective manufacturing process.

BRIEF SUMMARY

Carbon nanoparticles are described including carbon nanoparticles that are less than 1 micron volume equivalent sphere and have an Lc greater than 3.0 nanometers (nm).

Additional embodiments include: the carbon nanoparticle described above where the volume equivalent sphere is less than 700 nm; the carbon nanoparticle described above where the d002 is less than 0.35 nm; the carbon nanoparticles described above including a fullerene-like surface structure; the carbon nanoparticle described above where the particles have 0.2% hydrogen or less by weight as produced; the carbon nanoparticles described above where the particles have 0.4% oxygen or less by weight as produced; the carbon nanoparticles described above where the particles have 0.3% sulfur or less by weight as produced.

Elastomer composites containing the carbon nanoparticles described above compounded therein and additionally containing sulfur, are also described.

Additional embodiments include: the composite described above where the strain required to stretch the elastomer composite 300% of the original length is at least 90% of the reference carbon black elastomer composite value; the composite described above where the tan delta at 0° C. is at least 90% of the reference carbon black elastomer composite value; the composite described above where the tan delta at 60° C. is less than 110% of the reference carbon black elastomer composite value; the composite described above where the tan delta at 60° C. is less than 95% of the reference carbon black elastomer composite value.

A method of making carbon nanoparticles in a one step process is also described including adding a hydrocarbon to a heated gas to produce carbon nanoparticles that are less than 1 micron volume equivalent sphere and have an Lc greater than 3.0 nm.

Additional embodiments include: the method described above where the hydrocarbon has been mixed with a hot gas to effect removal of hydrogen from the hydrocarbon; the method described above where the nanoparticles are produced in an oxygen free atmosphere; the method described above where the hydrocarbon is natural gas; the method described above where the yield of carbon nanoparticles is at least 90%; the methods described above additionally including the use of one or more heat exchangers, filters, degas chambers, and/or backend equipment; the method described above where the backend equipment includes one or more of a pelletizer, a binder mixing tank connected to the pelletizer, and/or a dryer connected to the pelletizer.

These and additional embodiments are further described below.

DETAILED DESCRIPTION

Figure 1:
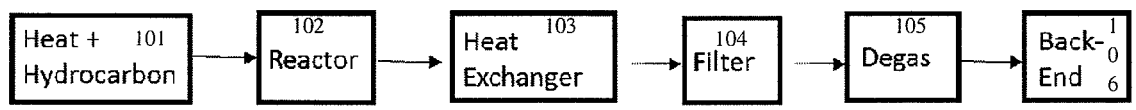
FIG. 1 demonstrates a flow chart of a process described herein.

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

Figure 2:
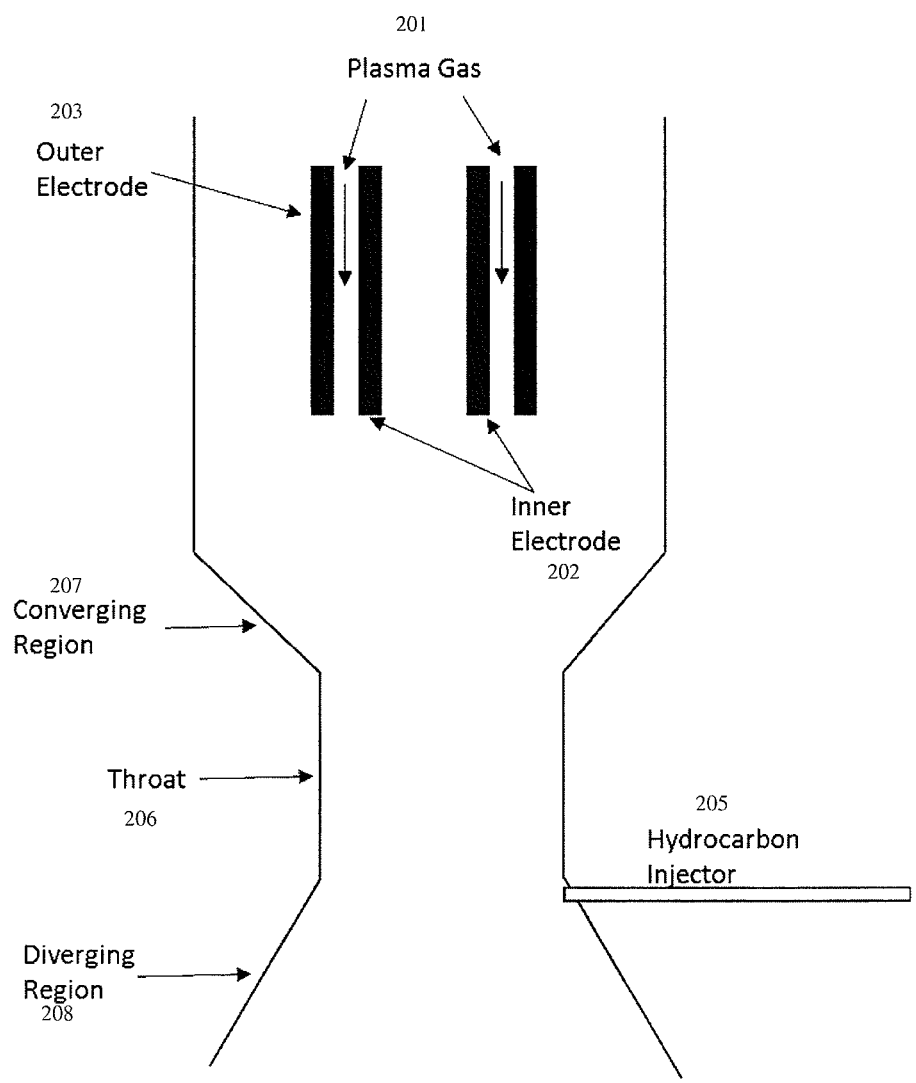
FIGS. 2, 3 and 4 depict various apparatus for carrying out processes described herein.
Figure 3:
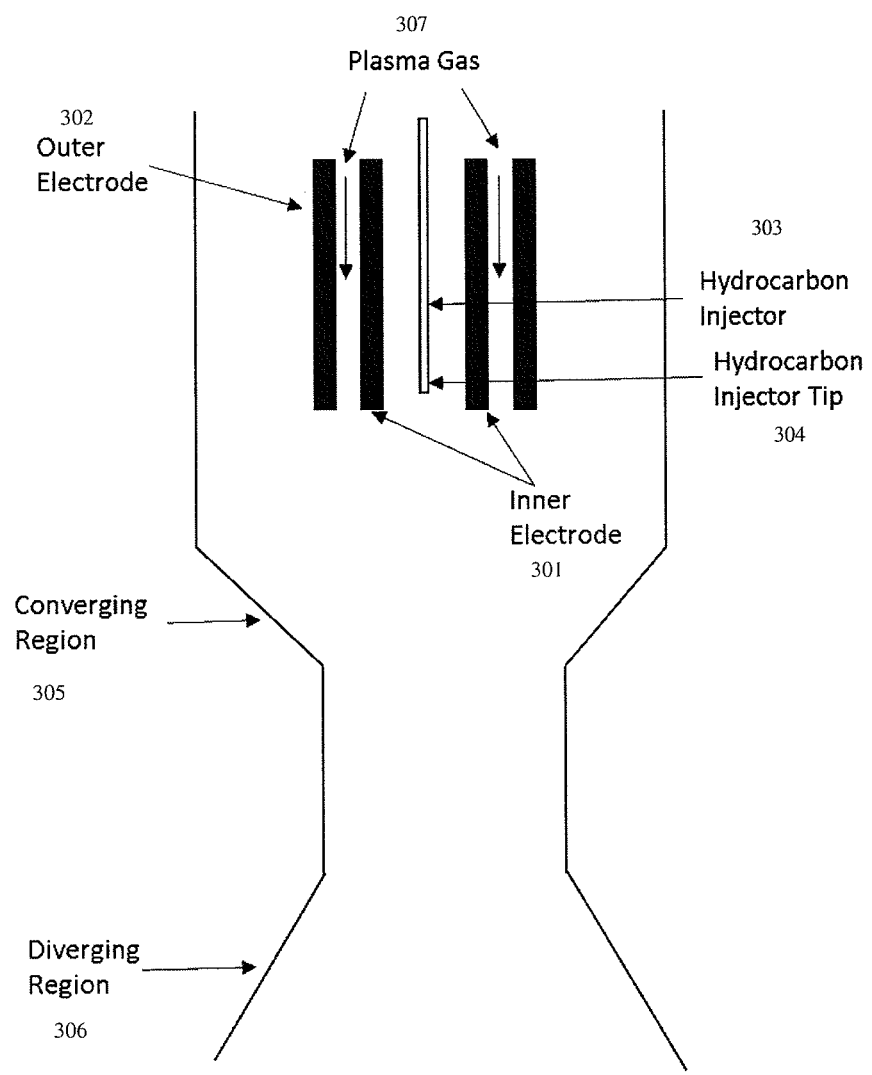
Figure 4:
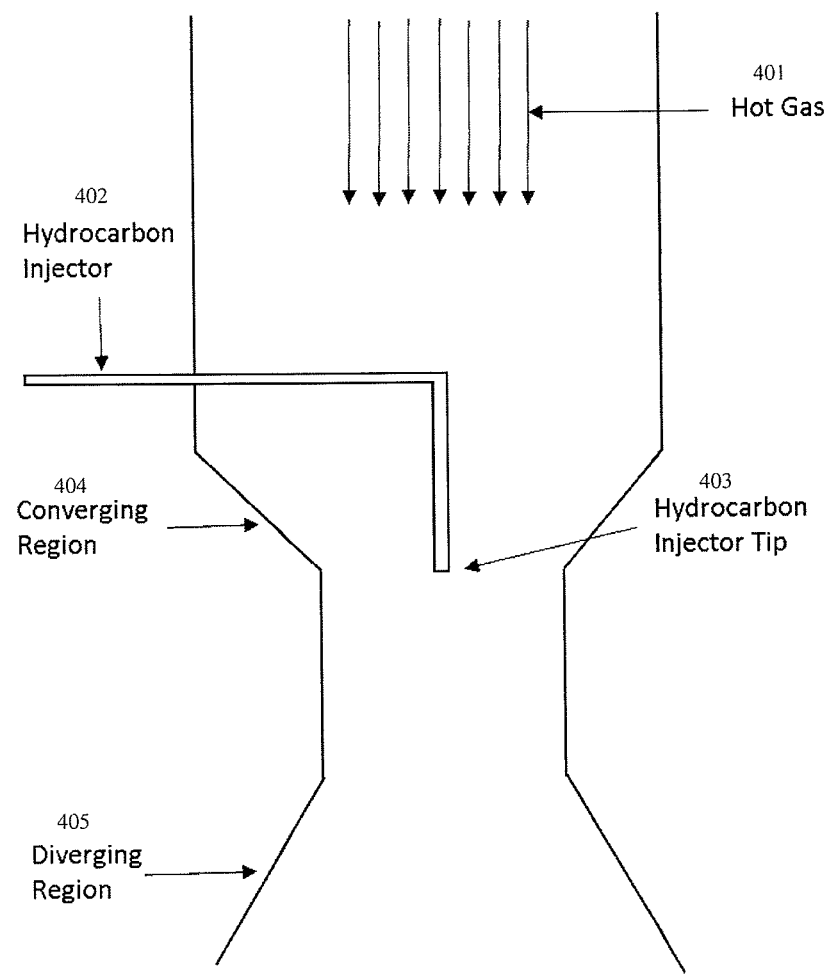

FIG. 1 shows that the process begins through the addition of hydrocarbon to hot gas. FIGS. 2, 3 and 4 show different methods of combining the hot gas and the hydrocarbon precursor. The hot gas is typically a stream of hot gas that is at an average temperature of over 2200° C. The hot gas will typically be comprised of greater than 50% hydrogen by volume.

The hydrocarbon feedstock used include any chemical within the formula $C_nH_x$ or $C_nH_xO_y$, where n is an integer, x is between 1n and 2n+2, and y is between 0 and n. For example, simple hydrocarbons such as methane, ethane, propane, butane, etc. can be used. Aromatic feedstocks such as benzene, toluene, methyl naphthalene, pyrolysis fuel oil, coal tar, coal, heavy oil, oil, bio-oil, bio-diesel, other biologically derived hydrocarbons, or the like can be used. Also, unsaturated hydrocarbon feedstocks can also be used, such as ethylene, acetylene, butadiene, styrene and the like. Oxygenated hydrocarbons such as ethanol, methanol, propanol, phenol, ketones, ethers, esters, and similar compounds are also acceptable feedstocks. The above should be viewed as non-limiting examples of acceptable hydrocarbon feedstocks which can additionally be combined and/or mixed with other acceptable components. The use of the term hydrocarbon feedstock herein, refers to feedstocks where the majority of the feedstock is hydrocarbon in nature. For example, natural gas would be a preferred hydrocarbon feedstock for the processes described herein.

Heat can also be provided through latent radiant heat from the wall of the reactor. This can either occur through heating of the walls via an external energy source or through the heating of the walls from the hot gas. The heat is transferred from the hot gas to the hydrocarbon feedstock. This will occur immediately upon addition of the hydrocarbon feedstock to the hot gas in the reactor or the reaction zone (102). The hydrocarbon will begin to crack and decompose before being fully converted into carbon black.

The process described herein is substantially free of atmospheric oxygen. The process is designed to include heating a gas that is comprised of 50% or greater by volume hydrogen and then adding this hot gas to a hydrocarbon (101). The process includes one or more of the steps of heating the gas, adding hydrocarbon to the hot gas, and can additional include the use of one or more of a heat exchanger (103), filter (104), degas chamber (105), and backend (106). The backend can optionally include one or more of a pelletizer, a binder mixing tank connected to the pelletizer, and a dryer connected to the pelletizer. These components are shown schematically in FIG. 1. With the exception of the degas unit, conventional pieces of equipment used in the carbon black industry to perform these functions can be used, as demonstrated, for example, by U.S. Pat. Nos. 3,981,659; 3,309,780; and 3,307,923, the disclosures of which are herein incorporated by reference. The degas unit which can be used is also described in commonly assigned, copending U.S. provisional patent application Ser. No. 62/111,346, Carbon Black Generating System, the entirety of which is incorporated by reference herein.

FIG. 2 shows a schematic representation of an embodiment of a typical apparatus described herein. Plasma gas (201) such as oxygen, nitrogen, argon, helium, air, hydrogen, carbon monoxide, hydrocarbon (e.g. methane, ethane) etc. (used alone or in mixtures of two or more) is injected into an annulus created by two electrodes that are positioned in the upper chamber in a concentric fashion. Plasma forming electrodes are arranged with an inner (202) and outer (203) electrode and a sufficiently large voltage is applied between the two electrodes. Electrodes are typically made of copper, tungsten, graphite, molybdenum, silver etc. The thus-formed plasma then enters into the reaction zone where it reacts/interacts with a hydrocarbon feedstock that is fed at the hydrocarbon injector (205) to generate a carbon black product. The walls of the vessel can withstand the plasma forming temperatures, with graphite being the preferred material of construction. And the hydrocarbon injector(s) (205) can be located anywhere on a plane at or near the throat (206) below the converging region (207) or further downstream of the throat in the diverging region (208) of the reactor. The hydrocarbon injector tips are arranged concentrically around the injection plane and there can be at least 6 injectors and up to 18 tips of this sort, or a slot, as non-limiting examples.

FIG. 3 shows another embodiment of a typical apparatus described herein. This is a two dimensional cutout of a reactor that utilizes inner (301) and outer electrodes (302) that consist of concentric rings of electrically conductive material, preferably graphite. Plasma gas (307) can flow through the annulus between the two electrodes where the arc will then excite the gas into the plasma state. The arc is controlled through the use of a magnetic field which moves the arc in a circular fashion rapidly around the electrode tips. In this example, the hydrocarbon is injected at the hydrocarbon injector (303) tip (304) through the center of the concentric electrodes via a hydrocarbon injector that can be optionally water cooled. The hydrocarbon injector tip can be placed to a point above the bottom plane of the electrodes, or it can be below the plane, or at the same height as the plane. Optionally, there are converging regions (305) leading to a narrowing of the reactor and then diverging regions (306) downstream of the converging region.

FIG. 4 shows another embodiment of an apparatus described herein. Hot gas is generated in the upper portion of the reactor either through the use of three or more AC electrodes, through the use of concentric DC electrodes as shown in FIGS. 2 and 3, or through the use of a resistive heater, more detail of which can be found in commonly assigned, U.S. Patent Application Ser. No. 62/209,017, High Temperature Heat Integration Method Of Making Carbon Black, the disclosure of which is herein incorporated by reference. The hot gas (401) is comprised of at least 50% hydrogen by volume that is at least 2400° C. The hydrocarbon injector (402) can be water cooled and enters from the side of the reactor and then turns into an axial position in regard to hot gas flow. The hydrocarbon injector tip (403) can be one opening or a plurality of openings that can inject hydrocarbons in clockwise or counter clockwise flow patterns to optimize mixing. Optionally, there are converging regions (404) leading to a narrowing of the reactor and then diverging regions (405) downstream of the converging region.

Figure 5:
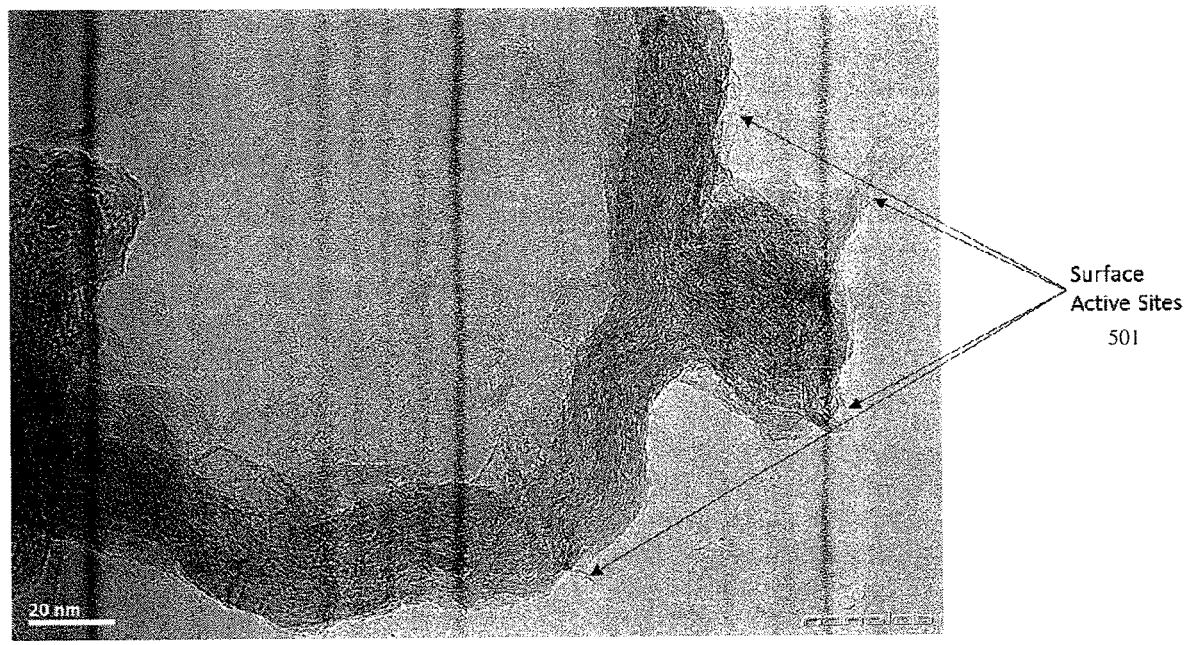
FIGS. 5 and 6 show typical Transmission Electron Micrograph (TEM) images of carbon nanoparticle produced by processes herein.
Figure 6:
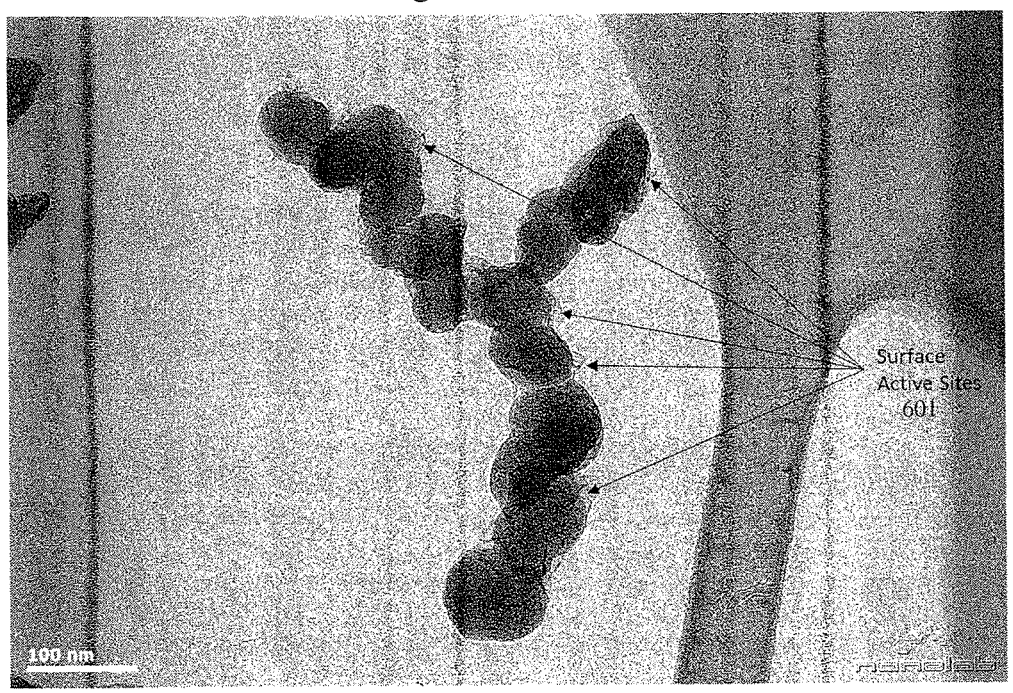

FIGS. 5 and 6 are Transmission Electron Micrograph (TEM) images of typical carbon nanoparticle produced by the above processes. The surface active sites (501 and 601) are unique to these high temperature techniques and are not found in furnace carbon black samples. Only some representative surface active sites are labelled.

In its early years, carbon black was made from oil and tar via the lamp or thermal process. In the mid-19$^{th}$ century, the channel process which utilized the impingement of natural gas on hot iron channels became the main method of manufacture of carbon black. In the early 1940s, the furnace process came to the forefront which utilizes a heavy oil such as pyrolysis fuel oil (PFO) to manufacture carbon black in an oxygen lean combustion environment at carbon yields of approximately 40-50%.

Plasma based synthesis of carbon black utilizing natural gas has both cost and pollution reducing advantages over the furnace process. The process is clean, emitting near zero local $CO_2$, and zero $SO_x$—compared to multiple tons of $CO_2$ for the furnace process, with tens of kilograms of $NO_x$ and $SO_x$ for every ton of carbon black produced. Although the plasma technique has been attempted many times throughout the last century, there have been no long term viable commercial production enterprises based on this process.

A one step process as described herein contains the reactants and products up until a degas step has been completed to remove the hydrogen that has been produced from the cracking of, for example, methane. Hydrogen is a highly combustible gas and must be separated from the as-produced carbon nanoparticles in order to manipulate the carbon nanoparticles. A degas is considered to be complete if the hydrogen level has been reduced to less than 20 percent by volume.

An oxygen free atmosphere is deemed to possess less than 5% oxygen by volume for the examples stated herein. Preferably, the oxygen free atmosphere is less than 3% or less than 1% oxygen.

In the past, plasma generator designs have not been able to meet the power, corrosion resistance, and continuous operation requirements to produce carbon black because of such things as the insufficient unit power of their basic components and the tendency of these components to decay when exposed to hydrogen plasma, resulting in lost reactor time, increased capital costs, and uneconomically produced carbon black, among other things. For more details concerning methods of heating hydrocarbons rapidly to form carbon nanoparticles and hydrogen please see the following commonly assigned, copending U.S. patent applications, the disclosures of which are herein incorporated by reference: Ser. No. 62/111,317, Carbon Black Combustible Gas Separation; Ser. No. 14/591,541, Use Of Feedstock In Carbon Black Plasma Process; Ser. No. 14/601,761, Plasma Gas Throat Assembly And Method; Ser. No. 14/601,793, Plasma Reactor; Ser. No. 62/198,431, DC Plasma Torch Electrical Power Design Method And Apparatus; Ser. No. 14/591,528, Integration Of Plasma And Hydrogen Process With Combined Cycle Power Plant, Simple Cycle Power Plant, And Steam Reformer; Ser. No. 62/202,498, Method Of Making Carbon Black; Ser. No. 14/610,299, Plasma Torch Design; Ser. No. 14/591,476, System For High Temperature Chemical Processing; Ser. No. 62/198,486, Method Of Making Carbon Black Including Thermal Transfer Gas; Ser. No. 62/111,341, Regenerative Cooling Method And Apparatus.

In addition, there have never been satisfactory rubber performance results of carbon nanoparticles produced in a plasma. When compounded into rubber, plasma based carbon nanoparticles have been substandard in performance when compared to furnace based carbon black. This is part of the reason that plasma produced carbon nanoparticles have never been adopted and mass produced. The processes and systems described herein can successfully generate quality carbon nanoparticles that can reinforce elastomer compounds.

Elastomer as defined herein refers to a class of polymers that are related to natural rubber that have both viscous and elastic components or viscoelasticity. Some example elastomers are natural rubber (NR), styrene butadiene rubber (SBR), polybutadiene, polyisobutylene, polyisoprene, nitrile rubber, ethylene propylene rubber (EPM), ethylene propylene diene rubber (EPDM), silicone rubber, fluoroelastomers, amongst other classes that can be found in "The Science and Technology of Rubber" (Mark, Erman, and Roland, Fourth Edition, Academic Press, ©2013).

Reinforcement of elastomer is defined as an increase in tensile strength, tear resistance, abrasion resistance, and modulus to increase beyond the values expected from simple particle-matrix theory. In other words, the carbon nanoparticle, be it carbon black or some other carbon nanoparticle, enables the stiffening of the gummy elastomer so that it can be more useful in applications such as tires, door seals, rubber hoses, etc.

A carbon nanoparticle is any particle which is 90% or greater carbon, has a surface area greater than 5 $m^2/g$ (square meters per gram), and the volume equivalent sphere possesses a diameter of less than 1 micron (displacement of liquid is equivalent to a 1 micron sphere or less per particle). This can be comprised of many different shapes including disks, bowls, cones, aggregated disks, few layer graphene (FLG), ellipsoidal, aggregated ellipsoidal, spheres, and aggregated spheres (e.g. carbon black), as non-limiting examples. The carbon nanoparticles can also comprise a plurality of these particle shapes. When using the definition of carbon nanoparticles, it is assumed that at least 90% of the particles in any given sample on a number basis fall within the confines of this definition.

Dibutyl phthalate (DBP) absorption measures the relative structure of carbon black by determining the amount of DBP a given mass of carbon black can absorb before reaching a specified viscous paste. Thermal blacks have the lowest DBP numbers (32-47 ml/100 g) (milliliters per gram) of any carbon black, indicating very little particle aggregation or structure. DBP is typically measured by following ASTM D2414-12. The nitrogen surface area (N2SA) and statistical thickness surface area (STSA) are measured via ASTM D6556-10.

Crystallinity of the carbon nanoparticle can be measured via X-Ray Crystal Diffractometry (XRD). Specifically for the measurements described herein, Cu K alpha radiation is used at a voltage of 40 kV (kilovolts) and a current of 44 mA (milliamps). The scan rate is 1.3 degrees/minute from 2 theta equal 12 to 90 degrees. The 002 peak of graphite is analyzed using the Scherrer equation to obtain Lc (lattice constant) and d002 (the lattice spacing of the 002 peak of graphite) values reported herein. Briefly, larger Lc values correspond to greater degree of crystallinity. Smaller lattice spacing (d002) values correspond to higher crystallinity or a more graphite like lattice structure. Larger lattice spacing (d002) of 0.36 nm or larger is indicative of turbostratic carbon which is common for carbon black samples produced via the furnace process. Elemental analysis is measured via devices manufactured by Leco and the results are given as percentage of the total sample.

Styrene butadiene rubber specimens were prepared according to ASTM D3191. ASTM D412 and ASTM D2240 were utilized to measure tensile properties and Shore A Hardness. Tangent delta was measured using TA Instruments RSA G2 device at a temperature range of −100 C to 100 C at a heating rate of 4 C/minute a strain of 0.5% and a frequency of 10 Hz.

TABLE 1

Physical Characteristics of Samples.

| Name | N2SA (m2/g) | STSA (m2/g) | DBP (mL/100 g) | Lc (nm) | d002 (nm) | S | H | N | O |
|---|---|---|---|---|---|---|---|---|---|
| N234 | 121 | 119 | 124 | 2.2 | 0.366 | 1.05 | 0.32 | 0.23 | 1.75 |
| N234 @1200 | 125 | 130 | 118 | 2.9 | 0.358 | 0.70 | 0.03 | 0.08 | 0.2 |
| N550 | 38.8 | 38.4 | 120 | 2.5 | 0.359 | 2.10 | 0.27 | 0.12 | 0.87 |
| N762 | 26.2 | 25.6 | 65 | 2.6 | 0.358 | 1.57 | 0.26 | 0.08 | 0.52 |
| M762 | 24.5 | 26.5 | 70 | 6.8 | 0.347 | 0.13 | 0.09 | 0.16 | 0.16 |
| M550 | 45.6 | 48.8 | 135 | 6.9 | 0.346 | 0.15 | 0.09 | 0.2 | 0.11 |

TABLE 2

Elastomer composite performance values.

| Name | 300% (psi) | Tensile Strength (psi) | Elongation at Break (%) | Durometer Shore Hardness |
|---|---|---|---|---|
| N234 | 3265 | 3507 | 326 | 75 |
| N234 @1200C | 1235 | 3036 | 589 | 68 |
| N762 | 1527 | 2870 | 496 | 63 |
| M762 | 1547 | 2609 | 437 | 64 |
| N550 | 2101 | 3161 | 450 | 58 |
| M550 | 2136 | 3033 | 401 | 58 |

TABLE 3

Tan delta values for elastomer composites.

| Sample | Tan Delta 60° C. | Tan Delta 40° C. | Tan Delta 0° C. |
|---|---|---|---|
| N762 | 0.1197 | 0.1329 | 0.1745 |
| M762 | 0.1106 | 0.1226 | 0.1747 |
| N550 | 0.1416 | 0.1553 | 0.2028 |
| M550 | 0.1325 | 0.1456 | 0.1995 |

Samples of competitor grades of N234, N550, and N762 carbon blacks were obtained. These samples were made via the furnace process with a heavy oil. N234 was heat treated in an inert atmosphere at 1200° C. and is labelled in the tables as "N234 @ 1200 C". M550 and M762 are designations given to Monolith carbon nanoparticles produced via mixing hot gas with natural gas as described herein.

Example 1

Manufacture of M762

Samples were manufactured using a setup similar to that shown in FIG. 3 where a hydrocarbon injector is inserted into the center of two concentric electrodes. The injector tip is 14 inches above the plane of the electrodes and the electrodes are operating at 650 kW. The plasma temperature was 2900° C. and the fully mixed reaction temperature was 2100° C. The hydrogen flow rate in the annulus between the electrodes was 90 Nm$^3$/hr (normal cubic meters/hour) and the shield flow around the outside of the electrodes was 242 Nm$^3$/hr. Natural gas was injected at a rate of 88 kg/hour. Yield of carbon nanoparticles based upon methane conversion rate was greater than 95%.

Example 2

Manufacture of M550

Samples were manufactured using a setup similar to that shown in FIG. 3 where a hydrocarbon injector is inserted into the center of two concentric electrodes. The injector tip is 14 inches above the plane of the electrodes and the electrodes are operating at 850 kW. The plasma temperature was 2900° C. and the fully mixed reaction temperature was 2100° C. The hydrogen flow rate in the annulus between the electrodes was 235 Nm3/hr (normal cubic meters/hour) and the shield flow around the outside of the electrodes was 192 Nm3/hr. Natural gas was injected at a rate of 103 kg/hour. Yield of carbon nanoparticles based upon methane conversion rate was greater than 94%.

Typical carbon black as currently made by the furnace process is made in a very similar fashion worldwide. Variation in hydrogen content, oxygen content, sulfur content and crystallinity is very minimal between different plants and different manufacturers. Grades are determined by the N2SA and by the DBP values. Only very minor differences can be determined due to differences in surface activity or crystallinity as all of the furnace blacks are very similar in these characteristics. Reference carbon black is a carbon black material as made in the furnace process that has values of N2SA and DBP within 20% of the carbon nanoparticles produced by the process described herein. In Table 1, the specific values of the reference furnace carbon black (labelled with "N" prefix) can be found and compared to the experimental grades that are labelled with an "M" prefix.

The importance of crystallinity and surface activity is paramount as can be seen in the examples from Tables 1 and 2. Through the heat treatment of N234 to only 1200° C., the reinforcement capability of the carbon black has been completely eliminated. The hydrogen content is lower and the crystallinity is higher. Both of these factors point to lower performance of the carbon black as a reinforcing agent according to various literature sources (for example, "The Science and Technology of Rubber" cited above and "Carbon Black Elastomer Interaction" Rubber Chemistry and Technology, 1991, pages 19-39—the disclosures of which both are herein incorporated by reference).

Specifically, the modulus at 300% has decreased from 3265 psi to 1235 psi (pounds per square inch). The elongation at break has increased from 326% to 589% indicating that the rubber composite test specimen with the heat treated N234 behaves almost as though there were no carbon black filler present. The specimen is not stiff and behaves as the raw rubber gum would behave in terms of ability to stretch and force required to pull the specimen to 3 times the original length. The increased crystallinity, decreased d002, decreased hydrogen content all point to a less active surface, even though the N2SA and DBP are almost unchanged. The composites also typically contain about 0.5% to about 4% by weight sulfur.

For Monolith samples, even though the crystallinity is more than double that of the furnace black counterpart, the hydrogen content is one-third that of the furnace black counterpart and there is more than 10 times less sulfur present, the samples reinforce rubber quite well.

This is a surprising result that runs counterintuitive to current thought in carbon black reinforcement science. One possibility to these strong results is the existence of "fullerene-like" moieties in the carbon black produced in the process described herein. Fullerene-like structures may be formed by the introduction of defects into a graphene sheet. The defects may form one or more pentagonal, heptagonal or other kind of rings, or a combination thereof, to create one or more fullerene-like structures. The defects may introduce curvature to the graphene sheet. These types of surface active species are observed in FIGS. 5 and 6. For more information about fullerene like moieties, please see "The Impact of a Fullerene-Like Concept in Carbon Black Science", Carbon, 2002, pages 157-162the disclosure of which is incorporated by reference herein. In this paper it is proposed to radiate already manufactured carbon black with plasma gas, however, it was not conceived to be possible until now that fullerene-like moieties (referred to as "surface active sites" (501 and 601) in FIGS. 5 and 6) could be manufactured in one step from a hydrocarbon precursor.

Increasing tan delta at 0° C. correlates to improved wet traction, while lowering tan delta at 60° C. correlates to improved rolling resistance. Generally, conventional tread rubber compounds that optimize tan delta at one temperature negatively impact tan delta at the other temperature. It is therefore surprising that the M550 and M762 (given above in Table 3) show the same performance for tan delta at 0° C. and improved performance at 60° C. when compared to reference furnace carbon black. This should correspond to better rolling resistance in tire tread grades of carbon black while maintaining wet grip performance.

Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An elastomer composite containing carbon nanoparticles that are less than 1 micron volume equivalent sphere diameter and have a lattice constant (Lc) greater than 3.0 nanometers (nm) compounded therein.

2. The elastomer composite of claim 1, wherein the volume equivalent sphere diameter is less than 700 nm.

3. The elastomer composite of claim 1, wherein a lattice spacing of the 002 peak of graphite (d002) is less than 0.35 nm.

4. The elastomer composite of claim 1, including a fullerene-like surface structure.

5. The elastomer composite of claim 1, wherein the carbon nanoparticles have 0.2% hydrogen or less by weight as produced.

6. The elastomer composite of claim 1, wherein the carbon nanoparticles have 0.4% oxygen or less by weight as produced.

7. The elastomer composite of claim 1, wherein the carbon nanoparticles have 0.3% sulfur or less by weight as produced.

8. The elastomer composite of claim 1, wherein strain required to stretch the elastomer composite 300% of the original length is at least 90% of a reference carbon black elastomer composite value.

9. The elastomer composite of claim 1, wherein tan delta at 0° C. is at least 90% of a reference carbon black elastomer composite value.

10. The elastomer composite of claim 1, wherein tan delta at 60° C. is less than 110% of a reference carbon black elastomer composite value.

11. The elastomer composite of claim 1, wherein tan delta at 60° C. is less than 95% of a reference carbon black elastomer composite value.

12. A method of making carbon nanoparticles in a one step process comprising adding a hydrocarbon to a heated gas to produce carbon nanoparticles that are less than 1 micron volume equivalent sphere diameter and have an Lc greater than 3.0 nm.

13. The method of claim 12 wherein the hydrocarbon has been mixed with a hot gas to effect removal of hydrogen from the hydrocarbons.

14. The method of claim 12 wherein the nanoparticles are produced in an oxygen free atmosphere.

15. The method of claim 12 wherein the hydrocarbon is natural gas.

16. The method of claim 12 wherein the yield of carbon nanoparticles is at least 90%.

17. The method of claim 12 additionally including the use of one or more heat exchangers, filters, degas chambers, and/or backend equipment.

18. The method of claim 17 wherein the backend equipment includes one or more of a pelletizer, a binder mixing tank connected to the pelletizer and/or a dryer connected to the pelletizer.

19. The elastomer composite of claim 4, wherein the fullerene-like surface structure includes one or more defects that introduce curvature to a graphene sheet of the carbon nanoparticles.

20. The elastomer composite of claim 1, further comprising sulfur.

* * * * *